(12) United States Patent
Tyebkhan et al.

(10) Patent No.: US 10,841,403 B2
(45) Date of Patent: Nov. 17, 2020

(54) ACCESSING A FILE USING A WEB-BASED ADAPTATION OF AN APPLICATION BASED ON A VERSION OF THE APPLICATION INSTALLED AT A USER DEVICE

(71) Applicant: Microsoft Technology Licensing, LLC, Redmond, WA (US)

(72) Inventors: Arwa Zoher Tyebkhan, Redmond, WA (US); Carlos G. Perez, Seattle, WA (US); Ronak M. Shah, Seattle, WA (US); Douglas R. Pearce, Seattle, WA (US); Michael W. Gelon, Seattle, WA (US); Yisheng Chen, Issaquah, WA (US); John R. Selbie, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 175 days.

(21) Appl. No.: 16/024,362

(22) Filed: Jun. 29, 2018

(65) Prior Publication Data
US 2020/0007654 A1     Jan. 2, 2020

(51) Int. Cl.
  *G06F 15/177*   (2006.01)
  *H04L 29/08*   (2006.01)
  *G06F 8/71*    (2018.01)

(52) U.S. Cl.
  CPC ............... *H04L 67/34* (2013.01); *G06F 8/71* (2013.01); *H04L 67/06* (2013.01); *H04L 67/02* (2013.01)

(58) Field of Classification Search
  CPC ..... H04L 67/34; H04L 67/06; H04L 63/0435; G06F 8/71; G06F 1/6218
  USPC ................. 709/220, 219, 231, 203, 229
  See application file for complete search history.

(56) References Cited

U.S. PATENT DOCUMENTS

| | | | |
|---|---|---|---|
| 5,732,275 A | 3/1998 | Kullick et al. | |
| 8,990,697 B2 | 3/2015 | Patel et al. | |
| 9,535,685 B1 | 1/2017 | Wang et al. | |
| 2006/0059174 A1 | 3/2006 | Mese et al. | |
| 2009/0171917 A1 | 7/2009 | Chou | |
| 2013/0346450 A1* | 12/2013 | Procopio ............. | G06F 21/6218 707/783 |

(Continued)

OTHER PUBLICATIONS

"International Search Report and Written Opinion Issued in PCT Application No. PCT/US19/037836", dated Sep. 11, 2019, 12 Pages.

(Continued)

*Primary Examiner* — Kaylee J Huang
(74) *Attorney, Agent, or Firm* — Michael Best & Friedrich LLP (57) ABSTRACT

Systems and methods for opening a file via a user device. One system includes an electronic processor. The electronic processor is configured to receive a request to open the file, determine a file type of the file, determine an application installed on the user device configured to open files of the file type, and determine a version of the application installed on the user device. The electronic processor is also configured to compare the version of the application installed on the user device to a predetermined version, and selectively open the file using a web-based adaptation of the application based on comparing the version of the application installed on the user device to the predetermined version.

17 Claims, 6 Drawing Sheets

(56) References Cited

U.S. PATENT DOCUMENTS

| | | | |
|---|---|---|---|
| 2014/0223423 A1* | 8/2014 | Alsina | G06F 8/65 |
| | | | 717/173 |
| 2014/0344247 A1* | 11/2014 | Procopio | G06F 16/248 |
| | | | 707/722 |
| 2015/0020058 A1 | 1/2015 | Cao et al. | |
| 2015/0058896 A1* | 2/2015 | Ohashi | H04N 21/43622 |
| | | | 725/58 |
| 2017/0168808 A1* | 6/2017 | Kakei | G06F 8/65 |
| 2017/0371686 A1* | 12/2017 | Shiotani | G06F 3/1288 |
| 2019/0250898 A1* | 8/2019 | Yang | G06F 8/65 |

OTHER PUBLICATIONS

"Join a Lync Meeting from Lync Web App", Retrieved from: https://support.office.com/en-us/article/join-a-lync-meeting-from-lync-web-app-5ec24979-3d91-4301-8a2c-0b4e0da69145, Retrieved on: May 10, 2018, 5 Pages.

"The Open button on dropbox.com", Retrieved from: https://web.archive.org/web/20171004082245/https:/www.dropbox.com/help/desktop-web/open-button, Oct. 4, 2017, 7 Pages.

\* cited by examiner

ACCESSING A FILE USING A WEB-BASED ADAPTATION OF AN APPLICATION BASED ON A VERSION OF THE APPLICATION INSTALLED AT A USER DEVICE

FIELD

Embodiments described herein relate to providing access to a file using a web-based adaptation of a software application and, in particular, relate to providing access to a file using a web-based version of an application when a version of the application installed on a user device is not up-to-date, and, thus, may limit the user's access to data included in the file or functionality associated with the file.

SUMMARY

When a user selects a file to open via a user device, the user device (for example, the operating system) determines a software application to use to open and process the file. For example, when the file is a spreadsheet file, the user device may identify a locally-installed software application configured to open and process this file type. Similarly, when the file is a word processing file, the user device identifies a locally-installed software application configured to open and process this file type. In some embodiments, the user device uses a file extension of the file to determine a file type and compares the determined file type to stored mappings representing software applications configured to open and process such file types. For example, a ".pdf" file extension designates portable document format files, which may be associated with Acrobat Reader® provided by Adobe Systems, Inc., a ".ppt" file extension designates presentation files, which may be associated with PowerPoint® provided by Microsoft Corporation, and a ".doc" or ".docx" file extension designates word processing files, which may be associated with Word® provided by Microsoft Corporation.

In some situations, the user device may not identify any locally-installed applications that are configured to open files of the requested file type. When this occurs, the user device may prompt the user to select an application from a list of available applications, which may include applications locally installed on the user device as well as applications available for download to the user device. If a user selects an application from the list that is not actually configured to open and process files of the requested file type, the user may not be able to access the file, may obtain a distorted or incomplete view of the data included in the file, or may not be able to interact with the data included in the file (edit, print, or the like) effectively.

Alternatively, when the user device identifies a locally-installed software application configured to open and process files of the requested file type, the user device opens the file as requested using the identified application. The identified application, however, may not be the most recent version of the application, which may again limit the user's access to and interaction with the file. For example, when the identified application is a word processing application, the version of the application locally-installed at the user device may not provide collaboration functionality, advanced editing functionality, or other functionality that only more recent versions of the application provide. Accordingly, in these situations, the locally-installed version of the application at the user device limits the processing of the opened file.

Thus, embodiments described here provide a solution to this limitation in functionality by not only determining whether a user device includes a locally-installed application for opening a particular file type but also determining what version of this application is installed and using (for example, automatically) a web-based adaptation of the application to provide relevant functionality for a particular file.

For example, one embodiment provides a system for opening a file via a user device. The system includes an electronic processor. The electronic processor is configured to receive a request to open the file, determine a file type of the file, determine an application installed on the user device configured to open files of the file type, and determine a version of the application installed on the user device. The electronic processor is also configured to compare the version of the application installed on the user device to a predetermined version, and selectively open the file using a web-based adaptation of the application based on comparing the version of the application installed on the user device to the predetermined version.

Another embodiment provides a method of opening a file via a user device. The method includes receiving a request to open the file, determining a file type of the file, determining an application installed on the user device configured to open files of the file type, and determining a version of the application installed on the user device configured to open files of the file type. The method also includes comparing, with an electronic processor, the version of the application installed on the user device to a predetermined version, and selectively opening the file using a web-based adaptation of the application based on comparing the version of the application installed on the user device to the predetermined version.

Yet another embodiment provides a non-transitory, computer-readable medium storing instructions that, when executed by an electronic processor, perform a set of functions. The set of functions includes determining a file type of a file to open via a user device, determining an application installed on the user device configured to open files of the file type, and determining a version of the application installed on the user device. The set of functions further includes comparing the version of the application installed on the user device to a predetermined version, and selectively opening the file using a web-based adaptation of the application based on comparing the version of the application installed on the user device to the predetermined version.

Other aspects of the invention will become apparent by consideration of the detailed description and accompanying drawings.

BRIEF DESCRIPTION OF THE DRAWINGS

FIG. 6 illustrates a graphical user interface displaying a prompt for opening a file included in a list of files in a

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, even if a user device includes a locally-installed version of an application for accessing files of a particular file type, the version of this installed application may limit the ability of the user to access or interact with data within the file. Accordingly, embodiments described herein determine a version of a locally-installed software application and automatically determine, based on this version, whether to open a requested file using the locally-installed software application or a web-based adaptation of the application to provide unrestricted or relevant software functionality.

Figure 1:
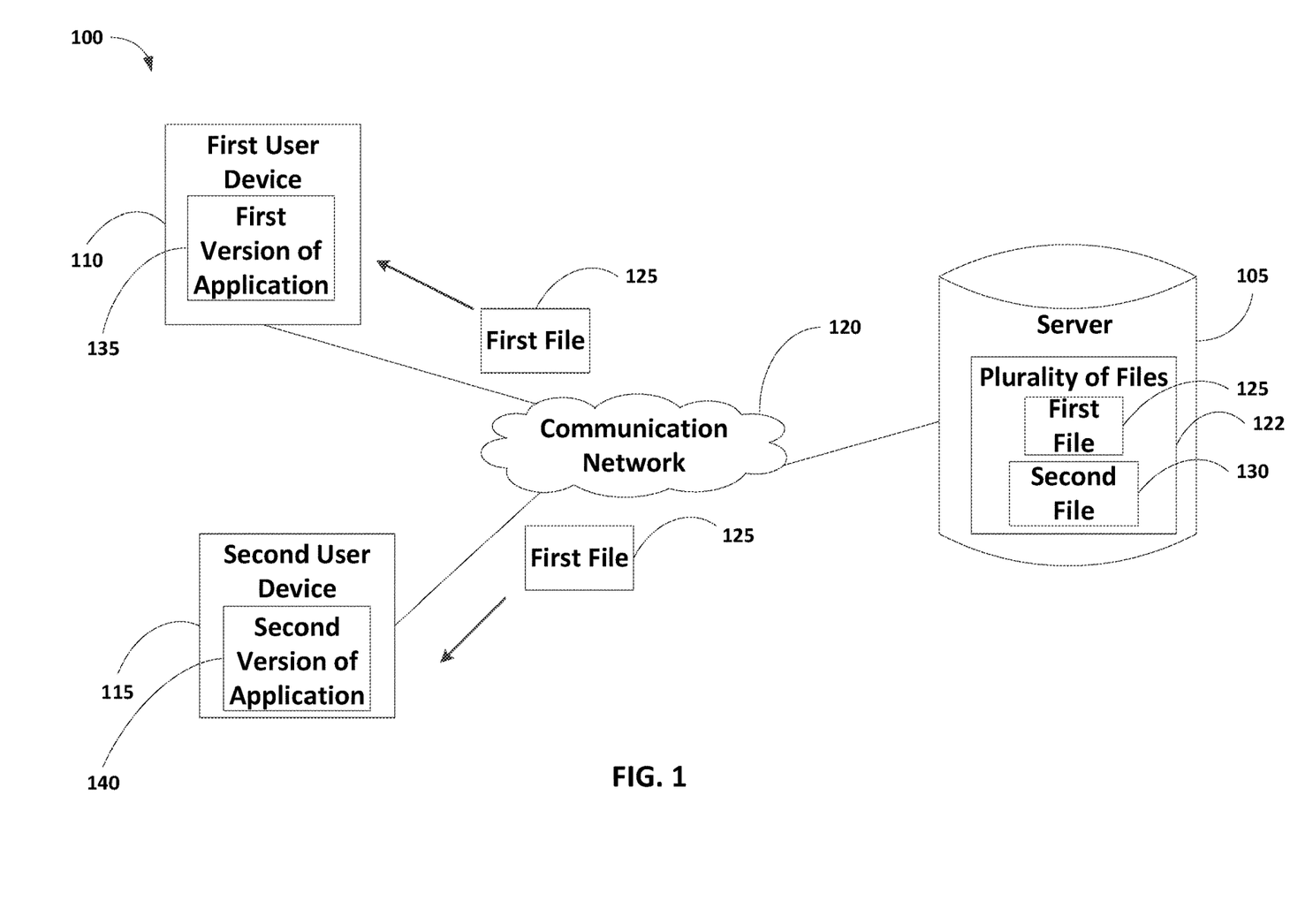
FIG. 1 schematically illustrates a system for opening files according to one embodiment.

FIG. 1 schematically illustrates a system 100 for opening a file. The system 100 may be, for example, a cloud-based storage or computing environment. The system 100 includes one or more servers (such as a server 105) and one or more user devices (such as a user device 110 and a user device 115). The servers 105 and the user devices 110 and 115 communicate over one or more wired or wireless communication networks 120. Portions of the wireless communication networks 120 may be implemented using a wide area network, such as the Internet, a local area network, such as a Bluetooth™ network or Wi-Fi, and combinations or derivatives thereof. It should be understood that each server included in the system 100 may communicate with any number of user devices, and the two user devices 110 and 115 illustrated in FIG. 1 are purely for illustrative purposes. Similarly, it should also be understood that the system 100 may include any number of servers and the single server 105 illustrated in FIG. 1 is purely for illustrative purposes. Also, in some embodiments, one of the user devices 110, 115 may communicate with the server 105 through one or more intermediary devices (not shown).

As described below, the server 105 stores a plurality of files 122 (such as a first file 125 and a second file 130) accessible via the user devices 110 and 115. As illustrated in FIG. 1, the server 105 may transfer a file to a user device via the communication network 120 when the server 105 receives a request for the file from the user devices (and in some cases proper credentials for accessing the file) or as part of a periodic synchronization between files stored on the server 105 and files stored on the user devices. In some embodiments, the server 105 also initially receives a file from a user device for storage purposes. For example, as noted above, the server 105 may provide a cloud-storage environment where users may upload or synchronize files locally stored on a user device with the cloud-storage environment and, thus, may subsequently access the uploaded files from the cloud-storage environment from the same or a different user device.

Figure 2:
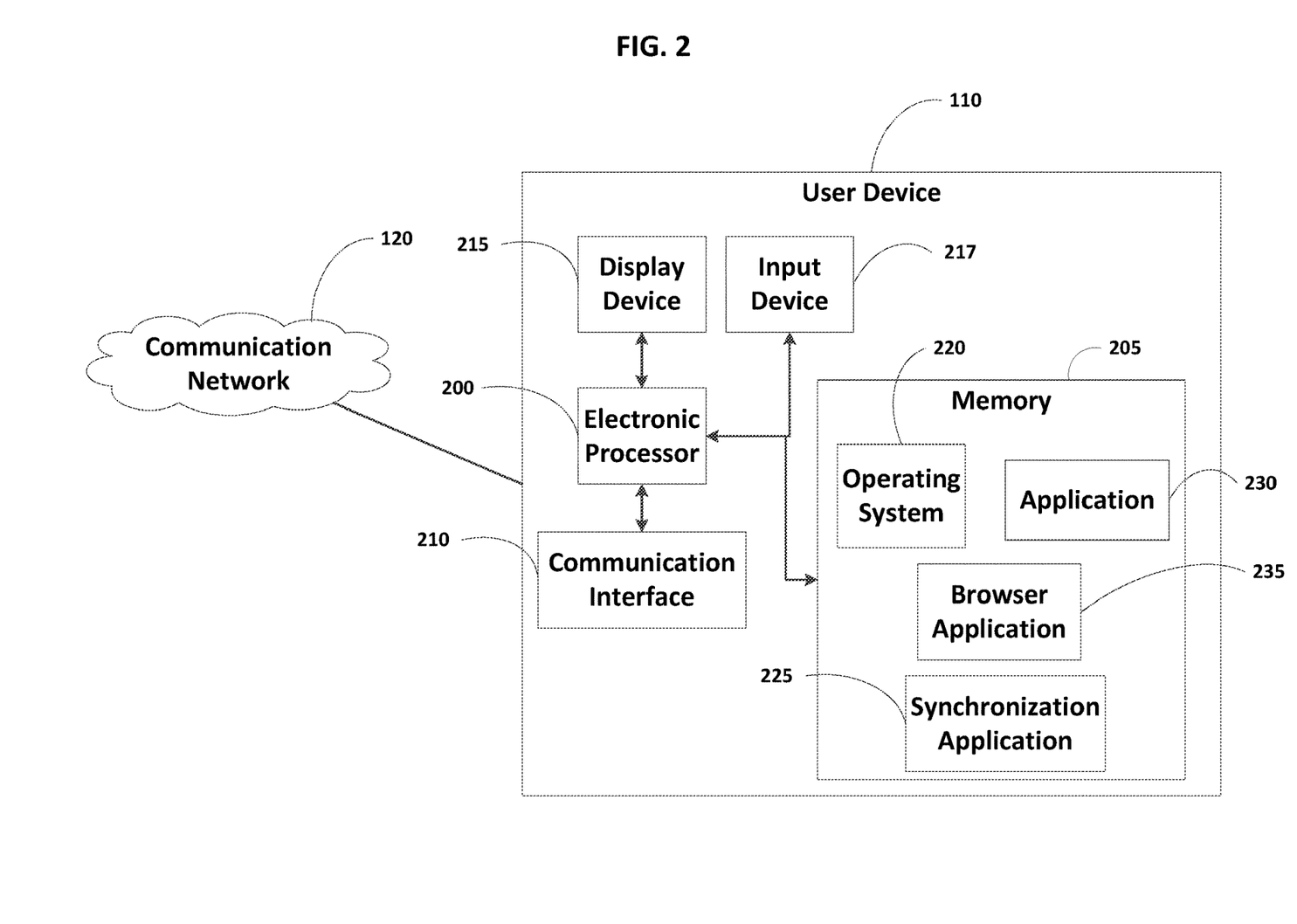
FIG. 2 schematically illustrates a user device included in the system of FIG. 1.

Each of the user devices 110 and 115 is used by a user or tenant of the system 100, and each user device 110, 115 includes an electronic device, such as a smart phone, a smart watch, a tablet computer, a laptop computer, mixed reality headsets, or the like. For example, as illustrated in FIG. 2, the user device 110 includes an electronic processor 200 (for example, a microprocessor, application-specific integrated circuit (ASIC), or another suitable electronic device), a memory 205 (for example, a non-transitory, computer-readable storage medium), and a communication interface 210 such as a transceiver, for communicating over the communication network 120 and, optionally, one or more additional communication networks or connections. As illustrated in FIG. 2, the user device 110 also includes a display device 215 and an input device 217. The display device 215 may be, for example, a touchscreen, a liquid crystal display ("LCD"), a light-emitting diode ("LED") display, an organic LED ("OLED") display, an electroluminescent display ("ELD"), and the like. The input device 217 may be, for example, a keypad, a mouse, a touchscreen (for example, as part of the display device 215), a microphone, a camera, or the like. The electronic processor 200, the memory 205, the communication interface 210, the display device 215, and the input device 217 communicate wirelessly, over one or more communication lines or buses, or a combination thereof. It should be understood that the user device 110 may include additional components than those illustrated in FIG. 2 in various configurations and may perform additional functionality than the functionality described in the present application. Also, it should be understood that, although not described or illustrated herein, the user device 115 may include similar components and perform similar functionality as the user device 110.

As illustrated in FIG. 2, the memory 205 of the user device 110 includes an operating system 220, a synchronization application 225, an application 230 configured to open files of one or more file types, and a browser application 235. It should be understood that the memory 205 may store additional applications and data, including locally stored files and the applications and data stored in the memory 205 may be stored on multiple memory devices or modules. Also, in some embodiments, the functionality described herein as being provided by the operating system 220, the synchronization application 225, and the application 230 may be distributed and combined in various configurations. For example, the functionality provided by the synchronization application 225 may be divided among multiple different applications or the functionality provided by the synchronization application 225 (or a portion thereof) may be performed by the application 230, the operating system 220, or a combination thereof.

The synchronization application 225 (when executed by the electronic processor 200) is configured to manage the uploading and downloading of files to the cloud-storage environment provided through the server 105. For example, the synchronization application 225 may provide a user interface that allows a user to specify what locally-stored files should be uploaded to the cloud-storage environment and other synchronization parameters, such as how frequently to perform synchronizations, when to synchronize files stored within the cloud-storage environment with locally-stored files, and the like. In some embodiments, when a user selects a file to open on the user device 110 or 115, the synchronization application 225 also automatically downloads a most recent version of the selected file from the cloud-storage environment to the user device 110 or 115. Similarly, as a user makes and commits changes to a locally-stored file, the synchronization application 225 automatically applies similar updates to the version of the file stored within the cloud storage environment.

As noted above, the application 230 (when executed by the electronic processor 200) is configured to open files of one or more file types. For example, the application 230 may be Word® provided by Microsoft Corporation, which is configured to open word processing files, such as files with the file extension ".doc" or ".docx." The application 230 is also associated with a version. For example, when the application 230 is Word®, the application 230 may be a 98 version, a 2003 version, a 2010 version, or the like. It should be understood that the version of an application may be specified in terms of a year, a sequential number (for example, version 2.0), a build, update, or installation number, a unique name, or the like. The operating system 220 maintains a list of installed applications and a mapping that designates what file types each installed application is configured to open and may also store a version of each currently-installed application.

The browser application 235 (as executed by the electronic processor 200) allows the user device 110 or 115 to access a web page, including web-based applications. In some embodiments, the browser application 235 is configured as a generic browser application configured to access any web page accessible over a communication network, such as the Internet. For example, the browser application 235 may include Internet Explorer® provided by Microsoft Corporation, Safari® provided by Apple, Inc., Chrome® provided by Google LLC, or Firefox® provided by Mozilla Corporation. However, in other embodiments, the browser application 235 may be configured as a dedicated-purposes browser application configured to access a specific web page or specific web-based application.

Figure 3:
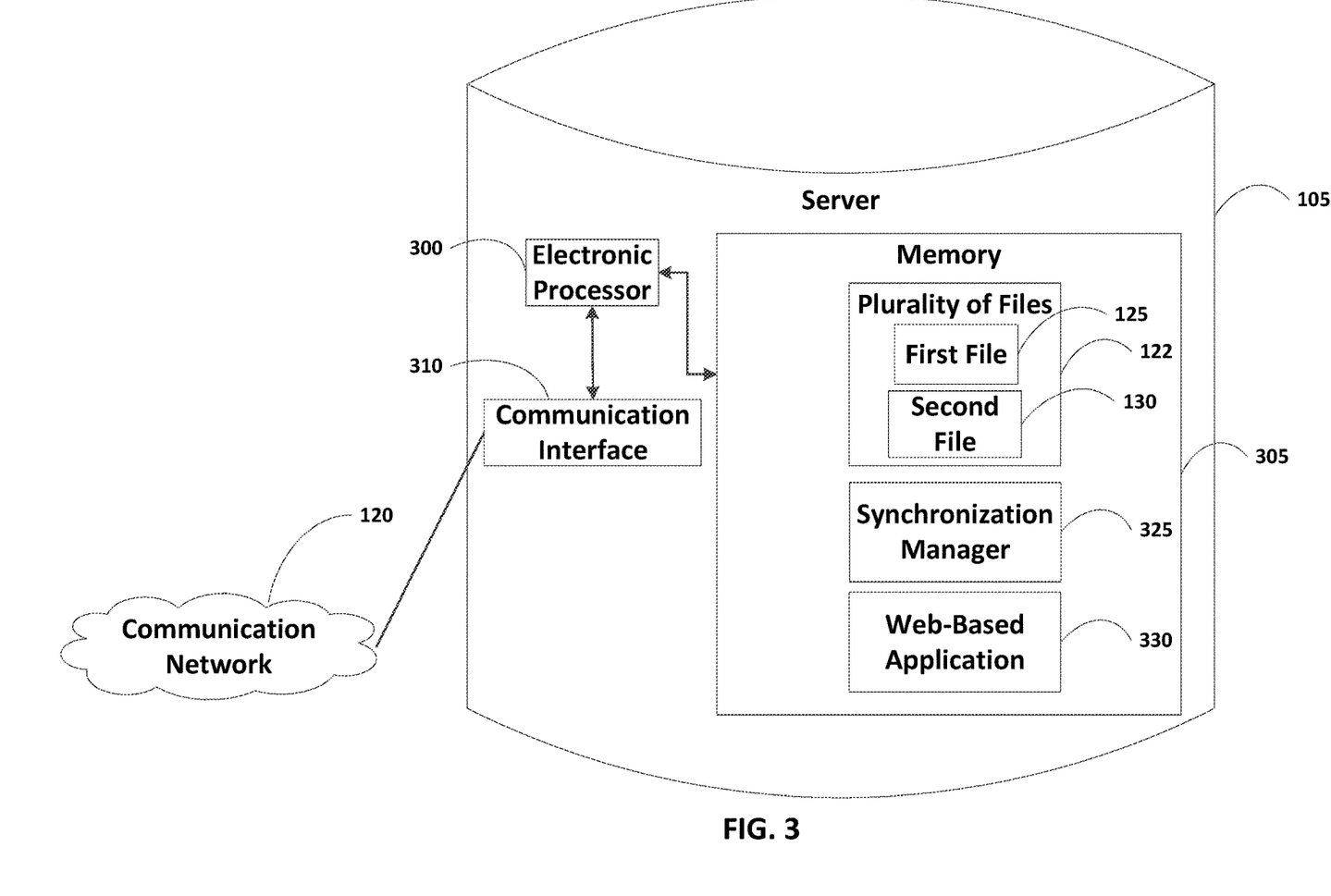
FIG. 3 schematically illustrates a server servicing user devices included in the system of FIG. 1.

As illustrated in FIG. 3, the server 105 is an electronic device that includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication networks 120 and, optionally, one or more additional communication networks or connections. The electronic processor 300, the memory 305, and the communication interface 310 communicate wirelessly, over one or more communication lines or buses, or a combination thereof. It should be understood that the server 105 may include additional components than those illustrated in FIG. 3 in various configurations and may perform additional functionality than the functionality described in the present application. Also, the functionality described herein as being performed by the server 105 may be distributed among multiple devices, such as multiple servers operated within the system 100.

As illustrated in FIG. 3, the server 105 stores (in the memory 305) a plurality of files 122 (including the first file 125 and the second file 130), and a synchronization manager 325. It should be understood that the memory 305 included in the server 105 may store additional applications and data, and the data and applications stored in the memory 305 may be stored on multiple memory devices or modules and may be configured and distributed in various configurations. For example, in some embodiments, the memory 305 also stores a web-based application 330, which is a web-based adaptation of the application 230. Also, in some embodiments, the functionality described herein as being provided by the synchronization manager 325 or the web-based application 330 may be distributed and combined in various configurations. For example, the functionality provided by the synchronization manager 325 may be divided among multiple different applications or the functionality provided by the synchronization manager 325 (or a portion thereof) may be performed by the web-based application 330.

The synchronization manager 325 may communicate with the synchronization application 225 installed on the user devices 110 and 115 to manage the uploading of files from the user devices 110 and 115 and the downloading of files to the user devices 110 and 115, including the synchronization of files stored on a user device and stored within the cloud-based storage environment. Similarly, the user devices 110 and 115 can access the web-based application 330 using the browser application 235 as described above. For example, if a user wants to open a file stored within the cloud-based storage environment within the web-based application 330, the user uses the browser application 235 to access the web-based application 330 and select the requested file currently stored in the cloud-based storage environment.

As described above, when the user is not working within the web-based application 330 and requests access to a file stored within the cloud-based storage environment, the synchronization application 225 installed on the user device 110 or 115 communicates with the synchronization manager 325 installed on the server 105 to download a copy of the requested file to the user device 110 or 115 (the memory 205). The downloaded copy is then opened within a locally-installed application configured to open the file type of the downloaded file (which the operating system 220 may select). Depending on the version of the locally-installed application, however, the user may not be able to fully access or interact with the data included in the downloaded file. For example, if the downloaded file was created or edited using a version of a word processing application that allows and tracks documentation collaboration that the locally-installed version of the word processing application does not support, this data and functionality is not available to the user and, hence, information is lost or restricted. Similarly, if the downloaded file was created or edited using a version of a presentation application that animates images that the locally-installed version of the word processing application does not support, this data and functionality is not available to the user.

Accordingly, to solve these and other problems, the system 100 may be configured to determine a version of a software application locally-installed at the user device 110 or 115 and determine whether to open a file using the locally-installed version of the application or a web-based adaptation application based on the version. For example, if a more recent version of the application is available as the web-based application 330, the file may be opened through the web-based application 330. In some embodiments, the locally-installed version of the application does not need to be the most recent version of the application to be used. In particular, the web-based application 330 may only be used when the version of locally-installed of the application is a predetermined version, such as an out-of-date version, a version that is no longer supported, or a version that is otherwise inadequate for accessing files.

Figure 4:
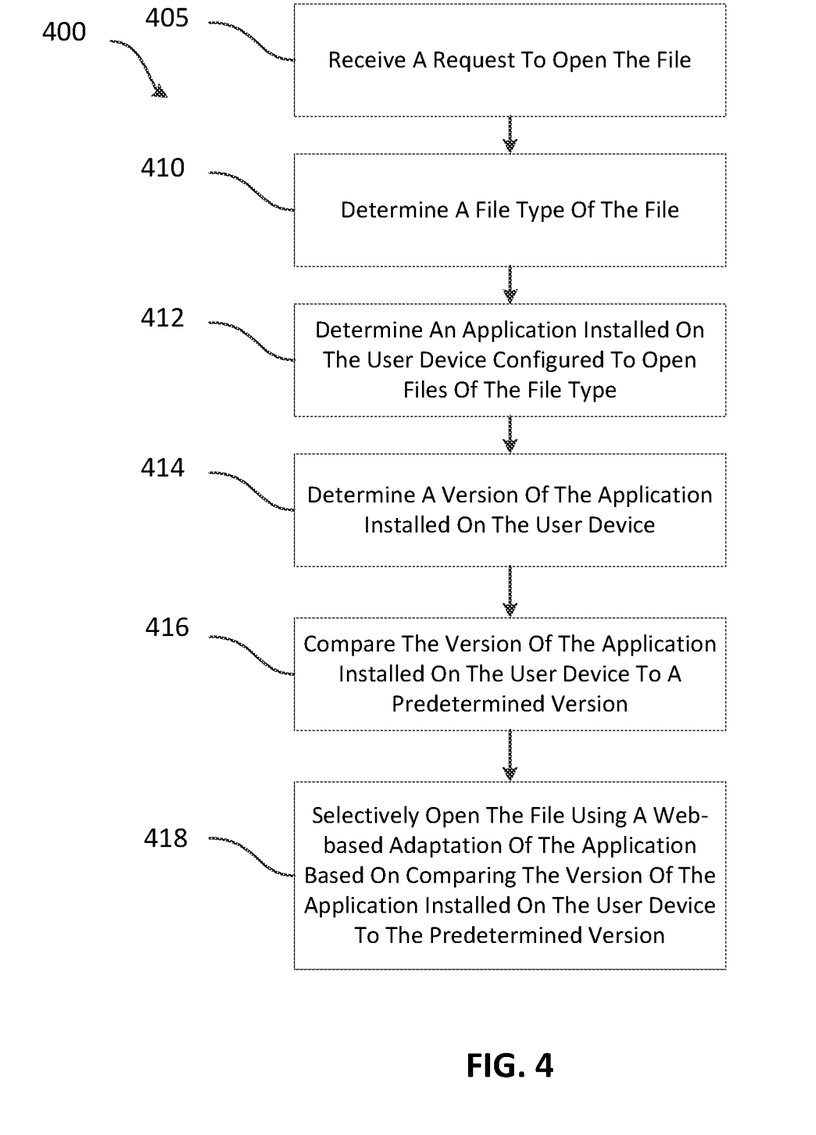
FIG. 4 is a flow chart illustrating a method of opening files using the system of FIG. 1 according to one embodiment.

FIG. 4 illustrates a method 400 of opening files using the system 100. The method 400 is primarily described as being performed by the synchronization application 225 as installed on a user device 110 or 115 (as executed by the electronic processor 200). However, as described in further detail below, in other embodiments, the method 400 may be performed by other applications or devices and may be performed by a combination of applications or devices.

As illustrated in FIG. 4, the method 400 includes receiving a request for a file associated with a user device 110 or 115 (at block 405). A request may be initiated by a user of the user device 110 or 115 by selecting a file within a file structure or manager of the user device 110 or 115. In some embodiments, the request is initiated by a user using a user device to open a file locally-stored on the user device. For example, the operating system 220, the synchronization application 225, the application 230, or a combination thereof may provide a user interface displaying available files, including files locally stored on the user device, which may also be mirrored on the cloud-based storage environment. In some embodiments, the available files may also include files currently stored on the cloud-based storage environment and available for download to the user device. It should be understood that a user may not directly initiate the request for a particular document. For example, another application installed at the user device 110 or 115 may initiate the request for the file, which may be based on user action, such as the opening of an electronic mail (email) message or the like.

Based on the request, the synchronization application 225 determines a file type of the requested file (at block 410) and determines an application 230 locally-installed on the user device 110 or 115 configured to open the determined file type (at block 412). As noted above, file types may be designated by the file extension of a file. In some embodiments, the synchronization application 225 may interact with the operating system 220 to determine a file type, to determine the locally-installed application 230 associated with the file type, or both. For example, as noted above, the operating system 220 may store mappings that associate particular file types with particular installed applications.

After determining the locally-installed application 230 configured to open the requested file (at block 412), the synchronization application 225 determines a version of the determined locally-installed application 230 (at block 414). Again, in some embodiments, the synchronization application 225 communicates with the operating system 220 to obtain this information. In other embodiments, this information may be stored within the synchronization application 225 or the synchronization application 225 may be configured to communicate with the locally-installed application 230 to request this information.

Depending on the version of the locally-installed application 230, the synchronization application 225 determines whether to open the requested file using the locally-installed application 230 or a web-based adaptation of the application. For example, as illustrated in FIG. 4, in some embodiments, the synchronization application 225 is configured to compare the version of the locally-installed application 230 to one or more predetermined versions of the application (at block 416) and is configured to selectively open the file using a web-based adaptation of the application based on the results of comparing the version of the locally-installed application 230 to at least one of the predetermined versions (at block 418).

In some embodiments, the predetermined versions may include a most-recent version of the application or a predetermined number of the most recent versions (current versions). Also, in some embodiments, the predetermined versions may include a most-frequently or commonly used version, which may or may not be the most recent or even a current version of the application. Accordingly, the predetermined versions may be recommended versions of the application for opening and interacting with files. The synchronization application 225 may have the predetermined versions hardcoded or may obtain the predetermined versions from the server 105 or another source periodically or on demand. Accordingly, in this embodiment, when the version of the locally-installed application 230 is not equal to at least one of the predetermined versions (which may indicate that the locally-installed version is out-of-date), the synchronization application 225 opens the requested file using the web-based adaptation of the application (through the browser application 235). In this situation, the web-based application 330 may access the file through the server 105 without downloading a local copy of the file to the user device 110 or 115. However, in other embodiments, a local copy of the file may still be downloaded and may be used within the web-based application 330. Alternatively, when the version of the locally-installed application 230 is equal to at least one of the predetermined versions, the synchronization application 225 opens the requested file using the locally-installed version of the application 230. In particular, the synchronization application 225 may download a local copy of requested file to the user device 110 or 115 (the memory 205), which is opened and displayed using the locally-installed application 230.

As an alternative to comparing a version of the locally-installed application 230 to one or more predetermined versions representing recent, current, or recommended versions, the synchronization application 225 may be configured to compare the version to one or more predetermined versions representing out-of-date versions. Accordingly, in this embodiment, when the version of the locally-installed application 230 is not equal to at least one of the predetermined versions (indicating that the locally-installed version is not out-of-date), the synchronization application 225 opens the requested file using the locally-installed version of the application 230, and, alternatively, when the version of the locally-installed application 230 is equal to at least one of the predetermined versions (indicating that the locally-installed version is out-of-date), the synchronization application 225 opens the requested file using the web-based application 330.

Also, in some embodiments, the synchronization application 225 considers other factors when determining whether to open the requested file using the locally-installed version or the web-based adaptation. For example, the synchronization application 225 may use attributes of the requested file, such as file creation date, last file modification data, data included in the file representing whether particular functionality only associated with more recent versions was used when creating or editing the file, or the like. Similarly, in some embodiments, the synchronization application 225 considers attributes of the user requesting the file, such as an organization the user is included in, what access rights the user has to web-based adaptations of the application, preferences or default settings associated with the user, or the like. Furthermore, in some embodiments, the synchronization application 225 considers attributes of the user device 110 or 115 where the request originated from, such a type or version of the operating system 220, the type or version of the browser application 235, a signal strength available to the communication interface 210 for accessing a web-based adaptation of the application, or the like. All or a subset of these factors may be considered when determining whether to use a locally-installed version or a web-based adaptation and, sometimes, may be used to determine the predetermined versions to compare the locally-installed version to or to determine what web-based adaptation to use (when multiple versions are available).

Figure 5:
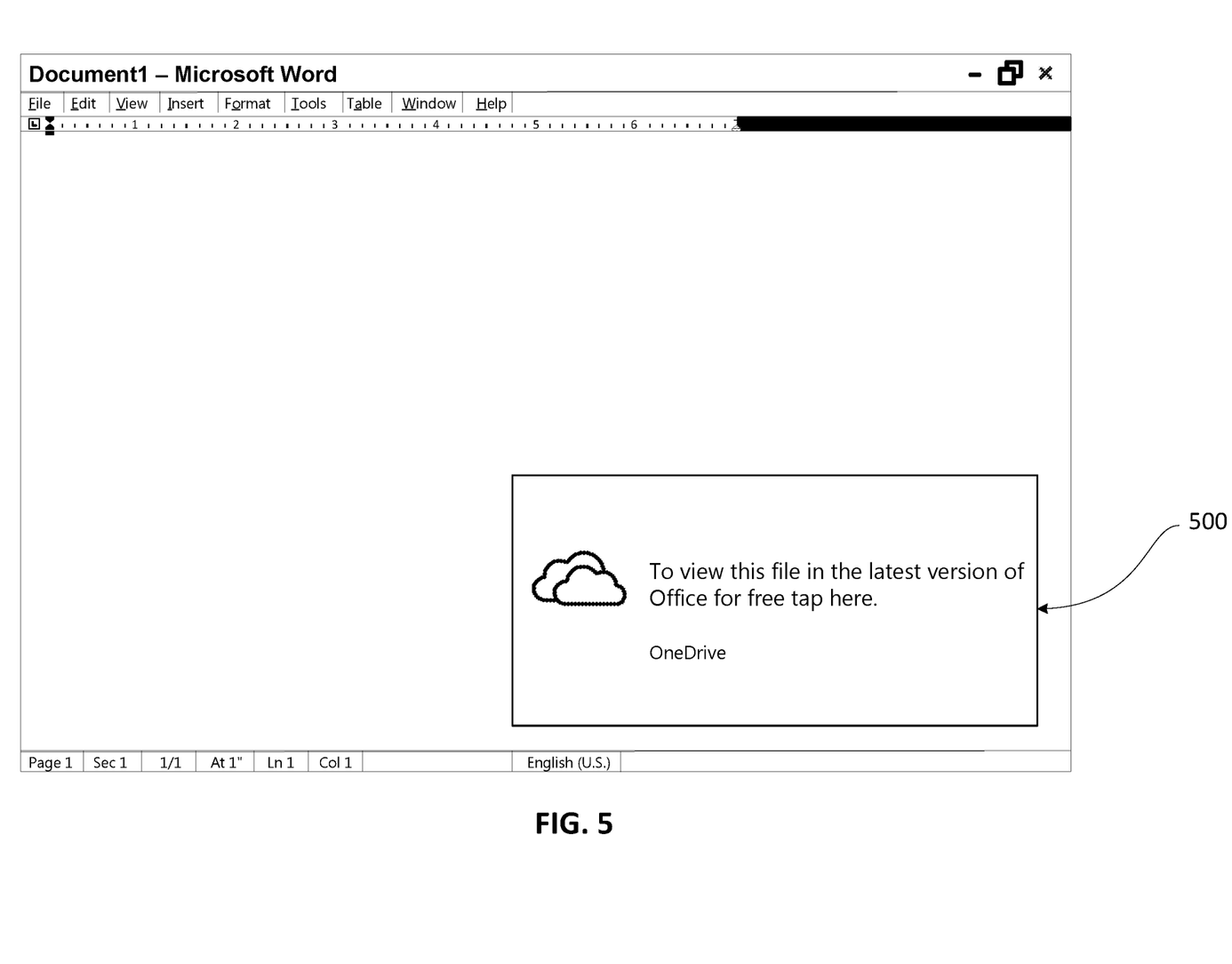
FIG. 5 illustrates a graphical user interface displaying a prompt for opening a file in a web-based adaptation of an application using the system of FIG. 1 according to one embodiment.

In some embodiments, when the synchronization application 225 determines that a web-based application 330 should be used to open a file (as compared to the locally-installed version), the synchronization application 225 may automatically open the file using the web-based adaptation. Alternatively, the synchronization application 225 may display a prompt to a user prompting the user to confirm or deny the use of the web-based adaptation. FIG. 5 illustrates one example of such a prompt 500, which prompts the user to confirm whether the web-based adaptation should be used. Thus, a user may manually override the application selection performed by the synchronization application 225. In some embodiments, whether the user is prompted before using the web-based adaptation can be controlled as part of the settings or configurations available through the synchronization application 225. Similarly, in some embodiments, when a user confirms the use of the web-based application 330, the synchronization application 225 may set a default setting (for the user) to use the web-based application 330 in future similar situations. Alternatively, the synchronization application 225 may be configured to display a second prompt to a user asking the user whether such a default setting should be established or whether the synchronization application 225 should continue to prompt the user for instructions on what version to use. In some embodiments, the synchronization application 225 may generate the above prompt prior to determining the version of the locally-installed application 230 to provide for a faster response in situations where the user wants to use the locally-installed application 230 regardless of whether another version is available as a web-based application.

In some embodiments, the prompt provided by the synchronization application 225 may inform the user of the different versions and may inform the user what data or functionality may be unavailable if the user chooses to use the locally-installed application 230. For example, the prompt may specify that the locally-installed application 230 does not provide particular functionality or may not correctly display particular data within the file. Thus, this information may allow a user to determine whether the functionality provided via the web-based application 330 would be beneficial. Again, the format, frequency, and triggers for such prompts or information may be configured on a user-basis through the synchronization application 225 or automatically by the synchronization application 225 based on previous interactions with the user.

Figure 6:
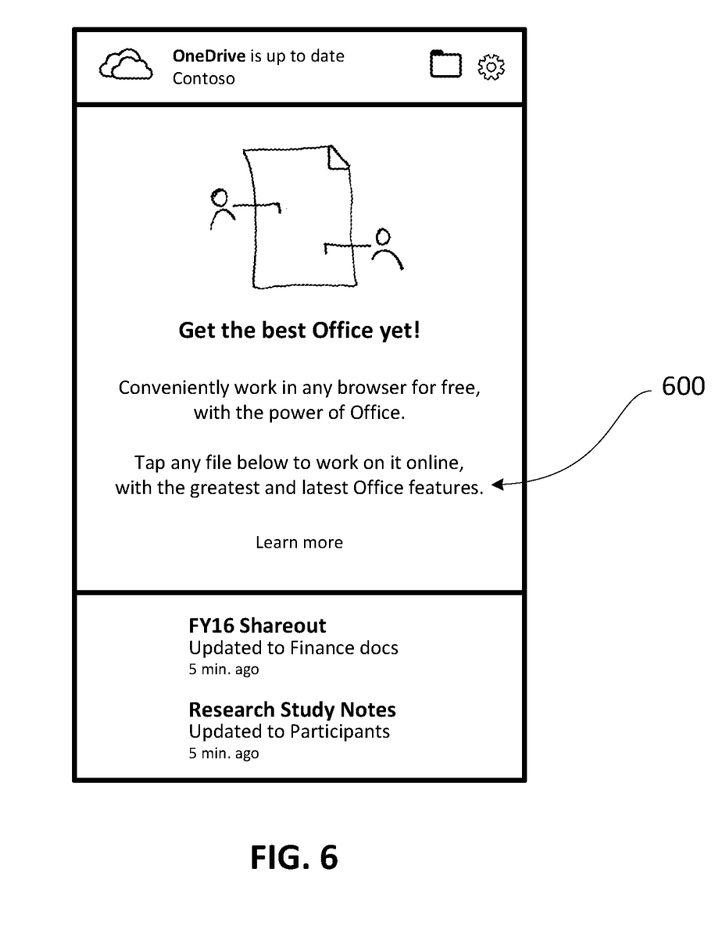

It should be understood that the prompts and informational messages described above may be displayed in response to a request to open a particular available file or in response to other user activities or triggers. For example, as illustrated in FIG. 6, the synchronization application 225 may be configured to display one or more messages 600 to alert a user of new or updated files available through the cloud-based storage environment (change to service throughout). Part of these messages may provide information regarding differences between a web-based adaptation of an application and the locally-installed version, additional or different functionality provided via the web-based adaptation, or a combination thereof. The messages may also indicate particular files that the user may want to consider using the web-based adaptation to obtain enhanced or full functionality or access to the file. Thus, a user may be able to use this information to directly use the web-based adaptation as compared to the locally-installed version, obtain an updated version of the application for local installation, or a combination thereof.

As noted above, although the method 400 is described herein as being performed by the synchronization application 225 as installed on the user device 110 or user device 115, the method 400 or portions thereof may be performed by other applications or devices. For example, in some embodiments, the method 400 or portions thereof may be performed by the synchronization manager 325 installed on the server 105. For example, when the server 105 receives a request from a user device 110 or 115 (via the synchronization application 225 for a file), the synchronization manager 325 may determine whether the file should be opened using a locally-installed version of the application at the user device 110 or 115 or a web-based adaptation. Similarly, in some embodiments, the operating system 220 or the application 230 installed on the user device 110 or 115 is configured to perform the method 400 or a portion thereof. For example, the method 400 is not limited to cloud-based storage services or environment and may be performed when a request is made to open a locally-stored file. In this situation, if the file is ultimately opened within a web-based adaptation of the application, the file may be uploaded to the server 105 or another server providing the web-based adaptation.

Also, embodiments described herein may be used in situations where a user device 110 or 115 does not include a locally-installed application configured to open a requested file. For example, when a user device 110 or 115 does not include a locally-installed application for opening a requested file, the web-based adaptation may be used. Similarly, factors regarding the file, the user, the user device 110 or 115, or a combination thereof, may be used to select a particular web-based adaptation to use or select a particular version for local installation at the user device 110 or 115. For example, in some embodiments, messages or a user interface may be provided to aid a user in updating a version of an application or initially installing an application.

Thus, embodiments described herein provide methods and systems for determining a version of a software application to use to open a requested file depending on the version of the application locally-installed on the user device associated with the request to ensure that data included in the file is fully and accurately accessible for display and interaction. Accordingly, although existing file opening technology is capable of selecting an appropriate locally-installed application for opening a particular file (based on file type), the technology fails to properly handle a situation where the locally-installed application is not the most current or updated version appropriate for the file. Also, by automating this selection, the selection can be made accurately and efficiently based on currently-installed versions of the application as well as currently-available versions of the application without relying on a user to specify what version they are using or knowing what versions are available. As also discussed above, the methods and systems described herein may consider other factors that a user may not be able to identify or use to determine how to open a particular file, such as whether a file includes data that benefits from advanced functionality available through a web-based adaption of an application.

Various features and advantages of some embodiments are set forth in the following claims.

What is claimed is:

1. A system for opening a file via a user device, the system comprising
an electronic processor configured to
receive a request to open the file,
determine a file type of the file,
determine an application installed on the user device configured to open files of the file type,
determine a version of the application installed on the user device,
compare the version of the application installed on the user device to a predetermined version, and
when the version of the application installed on the user device is not equal to the predetermined version, selectively open the file using a web-based adaptation of the application rather than the application installed on the user device.

2. The system of claim 1, further comprising, when the version of the application installed on the user device is equal to the predetermined version, the electronic processor is configured to selectively open the file using the application installed on the user device.

3. The system of claim 1, wherein the electronic processor is further configured to, prior to opening the file using the web-based adaptation of the application, prompt a user to confirm opening the file using the web-based adaptation of the application and receive a response to the prompt from the user, wherein the electronic processor is configured to open the file using the web-based adaptation of the application when the response includes a confirmation of opening the file using the web-based adaptation of the application and to open the file using the application installed on the user device when the response includes a rejection of opening of the file using the web-based adaptation of the application.

4. The system of claim 3, wherein the electronic processor is further configured to set a default setting associated with selectively opening the files of the file type with the web-based adaptation of the application based on the response.

5. The system of claim 3, wherein the prompt includes information regarding a difference between the version of the application installed on the user device and the web-based adaptation of the application.

6. The system of claim 3, wherein the prompt includes information regarding functionality available through the web-based adaptation of the application not available through the version of the application installed on the user device.

7. The system of claim 1, wherein the electronic processor is further configured to selectively open the file using the web-based adaptation of the application based on attributes of the file.

8. The system of claim 1, wherein the electronic processor is further configured to selectively open the file using the web-based adaptation of the application based on attributes of a user requesting the file.

9. The system of claim 1, wherein the electronic processor is further configured to selectively open the file using the web-based adaptation of the application based on attributes of the user device.

10. A method of opening a file via a user device, the method comprising
receiving a request to open the file;
determining a file type of the file;
determining an application installed on the user device configured to open files of the file type;
determining a version of the application installed on the user device configured to open files of the file type;
comparing, with an electronic processor, the version of the application installed on the user device to a predetermined version; and
when the version of the application installed on the user device is equal to the predetermined version, selectively opening the file using a web-based adaptation of the application rather than the application installed on the user device.

11. The method of claim 10, further comprising, when the version of the application installed on the user device is not equal to the predetermined version, selectively opening the file using the application installed on the user device.

12. The method of claim 10, wherein selectively opening the file using the web-based adaption of the application further includes selectively opening the file using the web-based adaptation of the application based on attributes of the file.

13. The method of claim 10, wherein selectively opening the file using the web-based adaptation of the application further includes selectively opening the file using the web-based adaptation of the application based on attributes of a user requesting the file.

14. The method of claim 10, wherein selectively opening the file using the web-based adaptation of the application further includes selectively opening the file using the web-based adaptation of the application based on attributes of the user device.

15. A non-transitory, computer-readable medium storing instructions that, when executed by an electronic processor, perform a set of functions, the set of functions comprising:
receiving a request to open a file;
determining a file type of the file to open via a user device;

determining an application installed on the user device configured to open files of the file type;

determining a version of the application installed on the user device;

comparing the version of the application installed on the user device to a predetermined version; and when the version of the application installed on the user device is equal to the predetermined version, selectively opening the file using a web-based adaptation of the application rather than the application installed on the user device.

16. The non-transitory, computer-readable medium of claim 15, the set of functions further comprising, when the version of the application installed on the user device is not equal to the predetermined version, selectively opening the file using the application installed on the user device.

17. The non-transitory, computer-readable medium of claim 15, wherein the predetermined version includes a most recent version of the application.

* * * * *